(12) United States Patent
Pujari

(10) Patent No.: US 10,748,148 B2
(45) Date of Patent: Aug. 18, 2020

(54) SYSTEM AND METHOD FOR SECURELY PROCESSING PAYMENT TRANSACTIONS

(71) Applicant: Jaswant Pujari, Sunnyvale, CA (US)

(72) Inventor: Jaswant Pujari, Sunnyvale, CA (US)

( * ) Notice: Subject to any disclaimer, the term of this patent is extended or adjusted under 35 U.S.C. 154(b) by 390 days.

(21) Appl. No.: 15/254,788

(22) Filed: Sep. 1, 2016

(65) Prior Publication Data

US 2017/0004496 A1 Jan. 5, 2017

Related U.S. Application Data

(63) Continuation-in-part of application No. 14/732,585, filed on Jun. 5, 2015, now abandoned.

(51) Int. Cl.
*G06Q 20/40* (2012.01)
*G06Q 20/38* (2012.01)

(52) U.S. Cl.
CPC ....... *G06Q 20/401* (2013.01); *G06Q 20/3821* (2013.01); *G06Q 20/3829* (2013.01)

(58) Field of Classification Search
CPC ............ G06Q 20/401; G06Q 20/3821; G06Q 20/3829
USPC .................................................. 705/50–79
See application file for complete search history.

(56) References Cited

U.S. PATENT DOCUMENTS 5,950,188 A * 9/1999 Wildermuth .......... G06F 21/445
6,041,123 A * 3/2000 Colvin, Sr. ............. H04L 9/083
713/153
6,442,448 B1 * 8/2002 Finley ................... B67D 7/145
700/231
7,379,920 B2 5/2008 Leung et al.
(Continued)

OTHER PUBLICATIONS

Requirennent3PCI_PCIDSS Compliance, attached as PDF file, downloaded from https://web.archive.org/web/20150405172335/http://pcidsscompliance.net/pci-dss-requirements/ (Year: 2015).*

(Continued)

*Primary Examiner* — James D Nigh
*Assistant Examiner* — Margaret M Neubig
(74) *Attorney, Agent, or Firm* — Foley & Lardner LLP

(57) ABSTRACT

A device includes memory and a processor. The memory is configured to store a transaction identifier corresponding to merchant identification information, customer identification information, and transaction information for a transaction. The processor is communicatively coupled to the memory. The processor is configured to receive, from a merchant computing device, a transaction request that includes the customer identification information and the transaction information. The transaction request does not include payment information. The processor is also configured to generate the transaction identifier. The transaction identifier is unique to the merchant identification information, the customer identification information, and the transaction information. The processor is further configured to transmit to a customer computing device an authorization request comprising the transaction identifier and merchant identification information. The processor is also configured to receive, from the customer computing device, a transaction authorization that includes the payment information and to process the transaction using the payment information.

15 Claims, 10 Drawing Sheets

(56) References Cited

U.S. PATENT DOCUMENTS

| | | | |
|---|---|---|---|
| 7,958,214 B1 | 6/2011 | Schwab et al. | |
| 8,099,077 B2* | 1/2012 | Chowdhury | G06Q 20/02 |
| | | | 455/406 |
| 8,219,473 B2 | 7/2012 | Gardner et al. | |
| 8,332,323 B2* | 12/2012 | Stals | G06Q 20/02 |
| | | | 235/379 |
| 8,442,868 B2* | 5/2013 | Collas | G06Q 30/00 |
| | | | 705/26.1 |
| 8,682,802 B1 | 3/2014 | Kannanari | |
| 8,751,272 B1 | 6/2014 | Seybold et al. | |
| 9,355,389 B2 | 5/2016 | Pauker et al. | |
| 9,811,827 B2* | 11/2017 | Naguib | G06Q 20/401 |
| 2004/0083184 A1 | 4/2004 | Tsuei et al. | |
| 2006/0131390 A1* | 6/2006 | Kim | G06Q 20/40 |
| | | | 235/380 |
| 2008/0189214 A1* | 8/2008 | Mueller | G06Q 20/3823 |
| | | | 705/65 |
| 2008/0283590 A1 | 11/2008 | Oder et al. | |
| 2009/0125444 A1* | 5/2009 | Cochran | G06Q 30/0185 |
| | | | 705/50 |
| 2010/0131347 A1* | 5/2010 | Sartipi | G06Q 20/325 |
| | | | 705/14.33 |
| 2014/0304094 A1 | 10/2014 | Reddy et al. | |
| 2014/0304157 A1 | 10/2014 | Bachenheimer et al. | |
| 2015/0046339 A1* | 2/2015 | Wong | G06Q 20/4016 |
| | | | 705/71 |
| 2016/0210606 A1 | 7/2016 | Henderson et al. | |
| 2017/0004496 A1 | 1/2017 | Pujari | |

OTHER PUBLICATIONS

Schneier, "Applied Cryptography", 1996, attached as PFD file. (Year: 1996).*

NPL, Nishika, ("A Lookup Table Based Secure Cryptographic SMS Communication on Android Environment", attached as a PDF file), downloaded from https://www.ijcsmc.com/docs/papers/June2013/V216201327.pdf (Year: 2013).*

Schneier, "Applied Cryptography", attached previously as PDF file (Year: 1996).*

Requirennent3PCLPCIDSS Compliance, previously attached as PDF file, downloaded from https://web.archive.org/web/20150405172335/http://pcidsscompliance.net/pci-dss-requirements/ (Year: 2015).*

Final Office Action on U.S. Appl. No. 14/732,585 dated Apr. 1, 2016.

Non-Final Office Action on U.S. Appl. No. 14/732,585 dated Sep. 23, 2015.

International Search Report and Written Opinion issued on PCT/US2017/048167, dated Nov. 3, 2017.

* cited by examiner

Merchant Website
Online Storefront

Virtual Terminal

Merchant Name
Address, City State Zip

Name:
Address:
City/St:
Phone:
Email:

Purchase Details:

| Item | Description | Qty | Rate | Amount |
|------|-------------|-----|------|--------|
| xxxx | yyyyyyyyy | 99.99 | 99.99 | 9999.00 |
| xxxx | yyyyyyyyy | 99.99 | 99.99 | 9999.00 |
| xxxx | yyyyyyyyy | 99.99 | 99.99 | 9999.00 |
| xxxx | yyyyyyyyy | 99.99 | 99.99 | 9999.00 |

$10

Pay Now
Generate and send transaction ID

No Card Data Required

Fig. 8

SYSTEM AND METHOD FOR SECURELY PROCESSING PAYMENT TRANSACTIONS

CROSS-REFERENCE TO RELATED APPLICATIONS

The present application is a Continuation-in-Part of U.S. application Ser. No. 14/732,585, filed Jun. 5, 2015, which is incorporated herein by reference in its entirety.

BACKGROUND

Payment processing heretofore requires the disclosure of card or account information from a buyer to a seller. For example, a buyer may be required to hand over the credit card or bank account information to the seller, enter the information on a website, or provide the information over the phone to an agent. The seller then can initiate a transaction that is processed through a network of service providers that includes, banks, payment processors, merchant account agents, shopping cart providers, and credit card companies such as Visa, MasterCard, American Express, Discover, etc.

Once the seller is in possession of the account information, the consumer is no longer in control of the privacy or security of their account information. For as long as there has been a system of processing transactions in this manner, there has been fraud and theft targeted at points of weakness in the handling and storage of the account information.

When a successful unauthorized fraudulent transaction takes place, everyone loses except the perpetrator of the theft. There have been several attempts at implemented technology and procedures to stop such fraudulent transactions. None of these attempts have been able to slow down the hackers attempting to get access to account information.

The Payment Card Industry (PCI) has standards and certification requirements for merchants, banks and processors, and other service providers to ensure the security of consumers' account information. There is Tokenization technology, ApplePay, AndroidPay, SamsungPay, Visa Checkout, Google Wallet technology, EMV, and Smart cards. In such systems, account information is exposed in too many places because of a lack of control or knowledge, creating a huge network of weak points that allows hackers to get access using smart electronic tools.

SUMMARY

Systems and methods described herein include payment processing including the movement and tracking of money from consumer to business (sale transactions), business to consumer (void and refund transactions) as well as business to business (sale, void and refund transactions) using cash, credit cards, bank account, Bitcoin exchange, other electronic methods of payment in any currency between a buyer and seller of goods and services. The transactions may take place via face-to-face interactions, online website shopping carts, mail orders, telephone orders, with or without a credit card being present at the time and place of the transaction.

Some systems and methods described herein eliminate the need for account information to be stored or exposed in millions of weak points in the global system of payment processing. The consumer never has to disclose the account information to any seller of goods and services.

An exemplary system includes one or more processors, an encryption generator communicatively coupled to the one or more processors, a transaction identification generator communicatively coupled to the one or more processors, and a storage device having stored computer-executable instructions which, when executed by the one or more processors, implement a method. This method includes receiving sale transaction data from a merchant, wherein the sale transaction data comprises merchant identification information, purchase data, and buyer data; encrypting, via the encryption generator, the sale transaction data; generating, via the transaction identification generator, a transaction identifier associated with the sale transaction data; sending the transaction identifier to a buyer; receiving buyer authorization data, wherein the buyer authorization data confirms the buyer intends to initiate a transaction; receiving payment data from the buyer, wherein the payment data comprises a method of payment; encrypting, via encryption generator, the payment data; combining the encrypted payment data and the encrypted sale transaction data; and completing the transaction.

An exemplary method includes receiving sale transaction data from a merchant, wherein the sale transaction data comprises merchant identification information, purchase data, and buyer data; encrypting the sale transaction data; generating a transaction identifier associated with the sale transaction data; sending the transaction identifier to a buyer; receiving buyer authorization data, wherein the buyer authorization data confirms the buyer intends to initiate a transaction; receiving payment data from the buyer, wherein the payment data comprises a method of payment; encrypting the payment data; combining the encrypted payment data and the encrypted sale transaction data; and completing the transaction.

An exemplary non-transitory computer readable medium has instructions stored thereon for execution by a processor. The computer readable medium includes instructions to receive sale transaction data from a merchant, wherein the sale transaction data comprises merchant identification information, purchase data, and buyer data; instructions to encrypt the sale transaction data; instructions to generate a transaction identifier associated with the sale transaction data; instructions to send the transaction identifier to a buyer; instructions to receive buyer authorization data, wherein the buyer authorization data confirms the buyer intends to initiate a transaction; instructions to receive payment data from the buyer, wherein the payment data comprises a method of payment; instructions to encrypt the payment data; instructions to combine the encrypted payment data and the encrypted sale transaction data; and instructions to complete the transaction.

An illustrative system includes a merchant computing device, a server, and a customer computing device. The merchant computing device is configured to receive customer identification information that identifies a customer. The customer identification information does not include payment information. The merchant computing device is further configured to receive transaction information that includes an amount of a transaction, wherein the transaction information does not include the payment information. The merchant computing device is further configured to transmit to a server a transaction request that comprises the customer identification information and the transaction information. The server is configured to receive the transaction request from the merchant computing device and generate a transaction identifier associated with the customer identification information and the transaction information. The server is also configured to transmit to the customer computing device an authorization request that includes the transaction identifier and merchant identification information. The customer computing device is configured to receive from the server the authorization request and receive from a user interface the payment information. The customer computing device is also configured to transmit, to the server, a transaction authorization and the payment information. The server is further configured to process the transaction using the payment information received from the customer computing device.

An illustrative device includes memory and a processor. The memory is configured to store a transaction identifier corresponding to merchant identification information, customer identification information, and transaction information for a transaction. The processor is communicatively coupled to the memory. The processor is configured to receive, from a merchant computing device, a transaction request that includes the customer identification information and the transaction information. The transaction request does not include payment information. The processor is also configured to generate the transaction identifier. The transaction identifier is unique to the merchant identification information, the customer identification information, and the transaction information. The processor is further configured to transmit to a customer computing device an authorization request comprising the transaction identifier and merchant identification information. The processor is also configured to receive, from the customer computing device, a transaction authorization that includes the payment information and to process the transaction using the payment information.

An illustrative method includes receiving, from a merchant computing device, a transaction request that comprises customer identification information and transaction information. The transaction request does not comprise payment information. The method also includes generating, by a server, a transaction identifier. The transaction identifier is unique to the merchant identification information, the customer identification information, and the transaction information. The method further includes transmitting, from the server to a customer computing device an authorization request comprising the transaction identifier and merchant identification information. The method also includes receiving, by the server from the customer computing device, a transaction authorization that includes the payment information and processing, by the server, the transaction using the payment information.

BRIEF DESCRIPTION OF THE DRAWINGS

Illustrative embodiments will hereafter be described with reference to the accompanying drawings.

FIG. 8 is a merchant virtual terminal interface for secure transaction payments in accordance with an illustrative embodiment.

DETAILED DESCRIPTION

Figure 1:
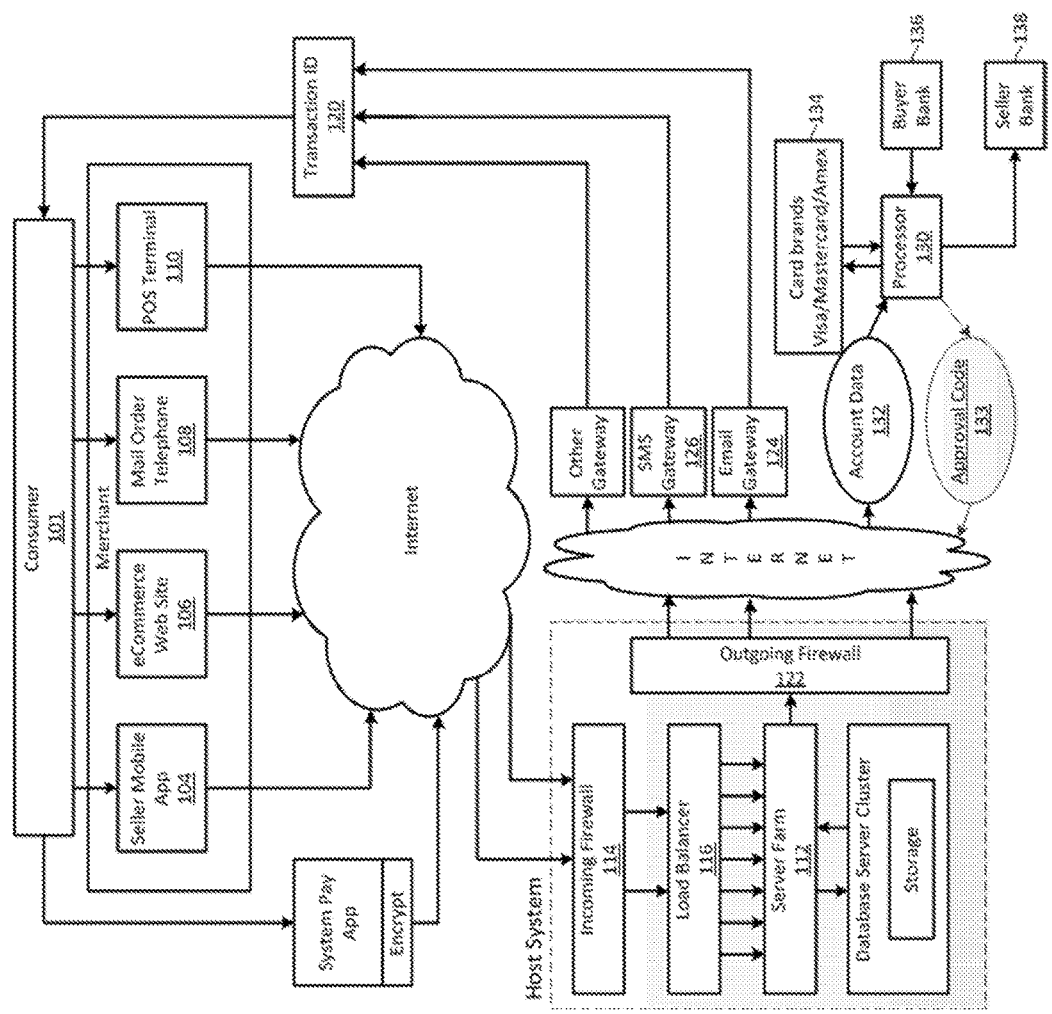
FIG. 1 is a block diagram of a system for securely performing transaction payments in accordance with an illustrative embodiment.

Described herein are illustrative embodiments for methods and systems that provide for securely processing transaction payments. In representative embodiments, a process completes credit card, Automated Clearing House (ACH), ApplePay, or Bitcoin transactions without disclosing the account information to the seller of the goods and services.

In a conventional face-to-face transaction, the consumer swipes a credit card on a point-of-sale (POS) terminal thereby giving the seller the account information. In a conventional online transaction, the consumer enters the account information on a website or in a mobile app thereby giving the seller the account information. In a conventional mail order or telephone purchase the consumer reads out the account information to the seller's agent over the phone. In a conventional ApplePay, NFC, or EMV (Eurocard, MasterCard, Visa, or other credit card) transaction, the consumer gives the seller all the account information electronically that may or may not be encrypted. In all of these instances, the account information is available to the seller to process and store the information or simply process and destroy the account information.

That is, in conventional financial transactions using credit cards, checks, or electronic wallets, the buyer provides to the seller enough information for the seller to initiate and complete the financial transaction. For example, a buyer of groceries at a supermarket provides a teller or POS machine credit card information such as the primary account number (PAN), expiration date of the credit card, and a card verification value (CVV). The seller provides to a financial institution the credit card information and the amount of the transaction, and money is transferred from the buyer's account (e.g., on credit) to the seller's account.

In such conventional transactions, there are multiple points along the system that can be exploited to steal money from the buyer. For example, at the POS machine, a scavenging device can be installed that reads the credit card information and stores the credit card information accessible by unauthorized people to carry out fraudulent transactions. Some unsavory sellers or merchants may store the received credit card information without the knowledge or consent of the buyer. The credit card information can then be used or sold to others for fraudulent transactions. In some instances, credit card information stored by a seller can be hacked and stolen. Furthermore, communication links between the buyer and seller or the seller and the financial institution can be compromised, allowing credit card or other personal information to be stolen.

However, in some embodiments described herein, the seller or merchant does not receive enough sensitive information from the buyer such that the seller or any other unauthorized person can perform unauthorized transactions. In an illustrative embodiment, a seller provides to a payment service the amount of the transaction and the identity of the buyer. The payment service then contacts the buyer independently and requests authorization of the transaction. The buyer can then approve or deny the transaction. If approved, the payment service may receive payment information directly from the buyer and process the financial transaction. In such an embodiment, the seller never receives information that can be used without the buyer's permission to process a fraudulent financial transaction. The information that the seller receives from the buyer is merely an identifier of the buyer. For example, if the seller attempted to process a fraudulent transaction, the request is sent to the buyer to approve or deny the transaction. The buyer can simply deny the transaction, thereby preventing any unauthorized transactions. Furthermore, the seller never receives any information that can be hacked or stolen and used to process fraudulent transactions.

Accordingly, some embodiments described herein solve security issues inherent in traditional commercial financial transactions. For example, traditional financial transactions that use computer networks such as the Internet or telecommunications typically require storage of customer information by a merchant at, for example, a POS terminal. Thus, inherent in traditional financial transactions is a security flaw in which individual merchants have access to sensitive customer information and/or the sensitive information is stored (at least temporarily) at the merchant's equipment and the customer has no control over the handling or security of the information. With the proliferation of the Internet and connectivity to merchant systems to the Internet, the sensitive customer information is at risk of being stolen (e.g., via hackers). Furthermore, not all merchants are honest and law abiding and my use acquired customer information to steal money from the customers. Various embodiments described herein solve such problems inherent in the traditional electronic-based financial transactions to more securely process financial payments between a merchant and a customer and keep sensitive information out of the hands of merchants.

In some embodiments described herein, the consumer provides the seller with the consumer's name, billing address, and shipping information, but not sensitive account information. In some embodiments, a system receives the consumer information, seller information, and the shipping information directly from the seller. The system provides the seller with a unique transaction identifier for the transaction, which may be encrypted. The seller provides the transaction identifier to the consumer, and the consumer uses the transaction ID to authorize the transaction. For example, the consumer can enter the transaction ID into an application (app) running on a smartphone. The consumer authorizes the payment by providing payment information directly into the described system using a mobile app, ApplePay, Google Wallet, Bitcoin wallet, etc. The consumer may also receive the transaction ID in an email or SMS text message sent to the consumer's email or cell phone number provided to the seller.

The transaction is approved by the consumer within the system app which triggers the processing of the transaction. The seller does not have the account information and cannot trigger a transaction at that time or any time later. In some embodiments, the consumer is always in control of the account information, and the initiation of the processing of the transaction. That is, the movement of money from the consumer's account to another account (e.g., the seller's account) does not occur until after the consumer authorizes the transaction by providing the system with an authorization. The authorization does not pass through the merchant.

A universal gateway can deliver the transaction securely to all processors, therefore allowing all existing merchant account providers to benefit from the system technology seamlessly. The described system is processor neutral and does not compete with banks, processors, ISO organizations and agents that rely on revenue from the transaction fees. Advantageously, the described system eliminates millions of weak points in the payment industry that store account information in order to process a transaction and have become the target of hackers.

Some embodiments of the described system protect the consumers' account information and puts the consumer in control of when a payment transaction is initiated from their account. Such a system protects the banks from millions of dollars of losses from fraudulent transactions and protects the credit card companies from losses due to fraud. The system helps expand the use of ApplePay, Google wallet, and Bitcoin exchange services as well as EMV and smart card technologies seamlessly. For example, smart card information can be entered into a digital wallet. In an illustrative embodiment, an apparatus can be used to receive smart card information (e.g., via a smart card reader or near-field communications device).

FIG. 1 is a block diagram of a system for securely performing transaction payments in accordance with an illustrative embodiment. In an illustrative embodiment, a consumer entity 101 interacts with a merchant. For example, the consumer entity 101 transmits sale data to the merchant such as a seller's merchant application. In the embodiment shown in FIG. 1, the consumer entity 101 interacts with the merchant via a seller mobile application (app) 104, an eCommerce web site 106, a mail order telephone 108, or a POS terminal 110. The seller mobile app 104 can be an application that runs on a consumer device (e.g., a computer, a laptop, a smartphone, a tablet, etc.). The consumer entity 101 can make purchases via the seller mobile app 104. For example, the seller mobile app 104 can include a game that allows in-app purchases. In another example, the seller mobile app 104 can facilitate a shopping experience. In such an example, the seller mobile app 104 can allow the consumer entity 101 to purchase items from the merchant. In alternative embodiments, the seller mobile app 104 can be any suitable application that facilitates payment from the consumer entity 101 to the merchant.

The eCommerce web site 106 can be a web site accessible via the Internet. The eCommerce web site 106 can facilitate the consumer entity 101 to transfer money from the consumer entity 101 to the merchant. For example, the eCommerce web site 106 can be a virtual store, a video game, an auction web site, etc. In alternative embodiments, the eCommerce web site 106 can be any suitable web site that facilitates payment from the consumer entity 101 to the merchant.

The mail order telephone 108 can be an interaction between the consumer entity 101 and the merchant via a telephone. For example, during a telephone conversation (or any other suitable interaction), the consumer entity 101 can indicate to the merchant that the consumer entity 101 will purchase or pay for something, such as an item or a service. In alternative embodiments, the consumer entity 101 can communicate in any suitable manner to the merchant, such as via email, text messaging, in-person, etc.

The POS terminal 110 can be, for example, a POS at a store such as a supermarket or restaurant. For example, the POS terminal 110 can be at a store in which the customer 101 selects products or services from the store to purchase. The POS terminal 110 can include equipment that facilitates financial transactions, such as barcode scanners, calculators, tills, etc. In alternative embodiments, the consumer entity 101 can interact with the merchant for any suitable financial transaction.

In an illustrative embodiment, the merchant receives information from the consumer entity 101. For example, the information can include an identity of the consumer entity 101, a telephone number of the consumer entity 101, a shipping address of the consumer entity 101, or any other suitable information. In an illustrative embodiment, the merchant receives a system username or ID. The merchant can receive the information relating to the consumer entity 101 via the seller mobile app 104, the eCommerce web site 106, the mail order telephone 108, the POS terminal 110, or via any other suitable source. The information received by the customer entity 101 can include a list of items to purchase, a total amount of the purchase, etc.

As shown in FIG. 1, the merchant can send the received consumer entity 101 information via the Internet (or any other suitable communications network) to an incoming firewall 114. In an illustrative information, the merchant sends the received consumer entity 101 information with merchant information. The merchant information can include, for example, a merchant identification (e.g., a username, an ID, a merchant name, etc.), a merchant address, etc. In an illustrative embodiment, the merchant encrypts the information before transmitting the information via the Internet. In an illustrative embodiment, the information is transmitted via a secure connection. The transmitted information can include a request for a transaction ID 120.

As shown in FIG. 1, the information transmitted from the merchant (e.g., the consumer entity 101 identification information and the merchant identification information) to the server farm 112 is via the incoming firewall 114 and the load balancer 116. In an illustrative embodiment, the firewall 114 and the load balancer 116 are part of the host system infrastructure. For example, the firewall 114 provides security, and the load balancer 116 provides scalability for a high volume of transactions. In alternative embodiment, any other suitable infrastructure elements may be used. In some embodiments, the firewall 114 and/or the load balancer 116 may not be used.

The server farm 112 can include one or more servers or other computing devices. In an illustrative embodiment, the server farm 112 receives the consumer entity 101 identification information and the merchant identification information and determines a transaction ID 120 based on the received information. In some embodiments, the transaction ID 120 is generated using other transaction information such as the purchase amount. In an illustrative embodiment, a unique transaction ID 120 is determined for each transaction. For example, each transaction between a consumer entity 101 and a merchant can have a unique transaction ID 120. In an illustrative embodiment, the consumer entity 101 identifying information and the merchant identifying information is stored in a database (e.g., the storage of the database server cluster of FIG. 1) with the transaction ID 120.

In an illustrative embodiment, the merchant encrypts the consumer entity 101 information and the merchant information via an encryption key stored in a computing device of the merchant. An application running on the server farm 112 decrypts the information via a decryption key stored in a memory accessible to the server farm 112. For example, the server farm 112 looks up the merchant identifying information and retrieves the respective decryption key. The server farm 112 uses the retrieved decryption key to decrypt the received information. The server farm 112 determines the unique transaction ID 120 based on the decrypted information. For example, the transaction ID 120 is a combination of multiple fields of data such as a host system identifier, the merchant identifier, and the transaction identifier. The fields of data may be concatenated and encrypted.

The system pay app retrieves a unique key assigned to itself from the server which it uses to encrypt the data. The encrypted data includes the 1st key which the server uses to lookup the 2nd key before decrypting the data using both keys and the encrypted data. For example, the first key can be used to look up the second key via a lookup database accessible by or stored on the host system. In the event the encrypted data is lost or compromised, it cannot be decrypted by a third party. Using the incoming buyer data, shipping data and the seller data and generates a Transaction ID 120.

In an illustrative embodiment, the server farm 112 transmits the transaction ID 120 to the consumer entity 101. As shown in FIG. 1, the server farm 112 transmits the transaction ID 120 through the outgoing firewall 122, the Internet, and at least one of an SMS gateway 126, an email gateway 124, or another suitable gateway. In an illustrative embodiment, the outgoing firewall 122 provides security by insulating the host system by enforcing outbound only access. The SMS gateway 126 can be a communication gateway that uses a short message service (SMS) or text message to transmit information. The email gateway 124 can use emails to transmit information.

In an illustrative embodiment, the transaction ID 120 is transmitted to the consumer entity 101 with a request to authorize the transaction. For example, a message can be sent to the consumer entity 101 with the transaction ID 120, an indication of the amount of the transaction (e.g., the amount of money to be transferred from the consumer entity 101 to the merchant), and an identification of the merchant. In an illustrative embodiment, the message includes a link such as a hyperlink.

In an alternative embodiment, the server farm 112 transmits the transaction ID 120 to the merchant, and the merchant provides the transaction ID 120 to the consumer entity 101. The consumer entity 101 can use the transaction ID 120 to query the server farm 112 for the transaction details such as the transaction amount and the merchant name.

In an illustrative embodiment, the consumer entity 101 receives the transaction ID 120 and can review the information in the message. For example, the consumer entity 101 can review the merchant, the amount of the purchase, and any other suitable information such as the shipping address or line items for purchase. In an illustrative embodiment, if the consumer entity 101 verifies the information, the consumer entity 101 can authorize the transaction.

In an illustrative embodiment, the consumer entity 101 can authorize the transaction using an application running on a computing device. For example, an app on a mobile device such as a smartphone, tablet, laptop, etc. can be used. In an illustrative embodiment, the message transmitted from the server farm 112 to the consumer entity 101 includes the transaction ID 120 and a link. The consumer entity 101 can use the link to initiate or open an app running on a mobile device of the consumer entity 101. The consumer entity 101 can use the app to pay or transfer money to the merchant. In an illustrative embodiment, by clicking the link, an authorization form within the payment app is pre-populated by the app by looking up information using the transaction ID 120.

For example, the consumer entity 101 can use the app to transfer money from an ewallet such as Apple Pay, Google Wallet, Bitcoin, etc. In some embodiments, the consumer entity 101 can transfer money using credit card information, a bank account, or any other suitable source of electronic funds. In an illustrative embodiment, the consumer entity 101 uses the app on their mobile device to send payment information to the server farm 112. For example, the consumer entity 101 can enter credit card information such as a PAN, an expiration date, a CVV code, etc. to the server farm 112 along with an authorization of the financial transaction. In another example, the consumer entity 101 can send the relevant information of an ewallet to the server farm 112 such that the financial transaction can be completed by the server farm 112. In an illustrative embodiment, the ewallet provides data (e.g., a credit card number and expiration date) when authorized by the user. The card number can be encrypted into a pseudo card number instead of an actual card number printed on a physical card. The expiration date of the card stored in the ewallet can be different (or in a different format) than an expiration date of a physical card. In alternative embodiments, any suitable ewallet (and associated data) can be used. For example, an ewallet may only release data when authorized by a user via a fingerprint or PIN code.

In an illustrative embodiment, the app running on the device of the consumer entity 101 transmits the transaction ID 120 and payment information in one or more encrypted messages. For example, the app can use an encryption key stored on the device (or in any other suitable storage accessible to the device, such as in a cloud computing network) to encrypt the message to the server farm 112. In an illustrative embodiment, the server farm 112 looks up an encryption key based on the identity of the sender of the message (e.g., the consumer entity 101). The server farm 112 can use the identified encryption key to decrypt the message received from the consumer entity 101. The decrypted information from the message (e.g., the authorization, the financial account information, etc.) can be used to process the transaction. In an illustrative embodiment, the server farm 112 uses the transaction ID 120 from the message received from the consumer entity 101 to determine the amount of the transaction.

In an illustrative embodiment, the message transmitted from the consumer entity 101 to the server farm 112 includes the transaction ID 120 and an authorization. In such an embodiment, the message does not include the financial information to process the transaction. In such an embodiment, the server farm 112 can look up stored financial information of the consumer entity 101 in a database accessible to the server farm 112.

In an illustrative embodiment, the consumer computing device encrypts the payment data using a first key stored in the device. The payment data can be decrypted by the server farm 112 by retrieving and using a second key. The consumer's payment app retrieves a unique key stored on the consumer's computing device. The unique key was previously assigned to the consumer from the server farm 112. The encrypted data transmitted to the server farm 112 from the consumer device includes the first key, which the server uses to lookup the 2nd key before decrypting the data using both keys and the encrypted data. For example, a two-key encryption system can be part of an algorithm for a high level of security. In the event that the encrypted data is lost or compromised, the data cannot be decrypted by a third party that does not have access to the second key. The encrypted data is sent over a secure connection to the server farm 112 through the firewall 114. In an illustrative embodiment, the firewall 114 enforces a rules-based security for transport of the transaction data.

The server farm 112 sends the payment data to a processor 130 based on the merchant account 132 for the seller. The processor 130 sends the payment data for authorization to the appropriate card brands 134, e.g. Visa, MasterCard, American Express, Discover. That is, the server farm 112 transmits the payment data to the processor 13 that processes the transaction and transfers the funds from the customer's account to the merchant account.

In an illustrative embodiment, the processor 130 sends an approval code 133 response back to the server farm 112 with an authorization code indicating success or failure of the transfer of funds. In an illustrative embodiment, the server farm 112 transmits the response to the consumer entity 101 and the merchant.

Thus, in an illustrative embodiment, the consumer entity 101 gives to the merchant an ID of the consumer entity 101. The merchant transmits the consumer entity 101 ID, a transaction amount, and a merchant ID to the server farm 112. The server farm 112 transmits to the consumer entity 101 a transaction ID 120, the merchant ID (or another suitable identifier of the merchant such as a name or address), and the transaction amount. The consumer entity 101 uses an app on a mobile device (or any other suitable computing device) to transmit to the server farm 112 the transaction ID and payment information. The server farm 112 can process the financial transaction (e.g., with a third-party such as a bank or credit card company) to transfer money from the consumer entity 101 to the merchant.

In such an embodiment, the merchant does not receive information that can be used at a later time to complete a financial transaction without the authorization of the consumer entity 101. That is, if the merchant makes an additional money transfer request, the consumer entity 101 can deny the request when the consumer entity 101 receives the transaction ID from the server farm 112.

Figure 2A:
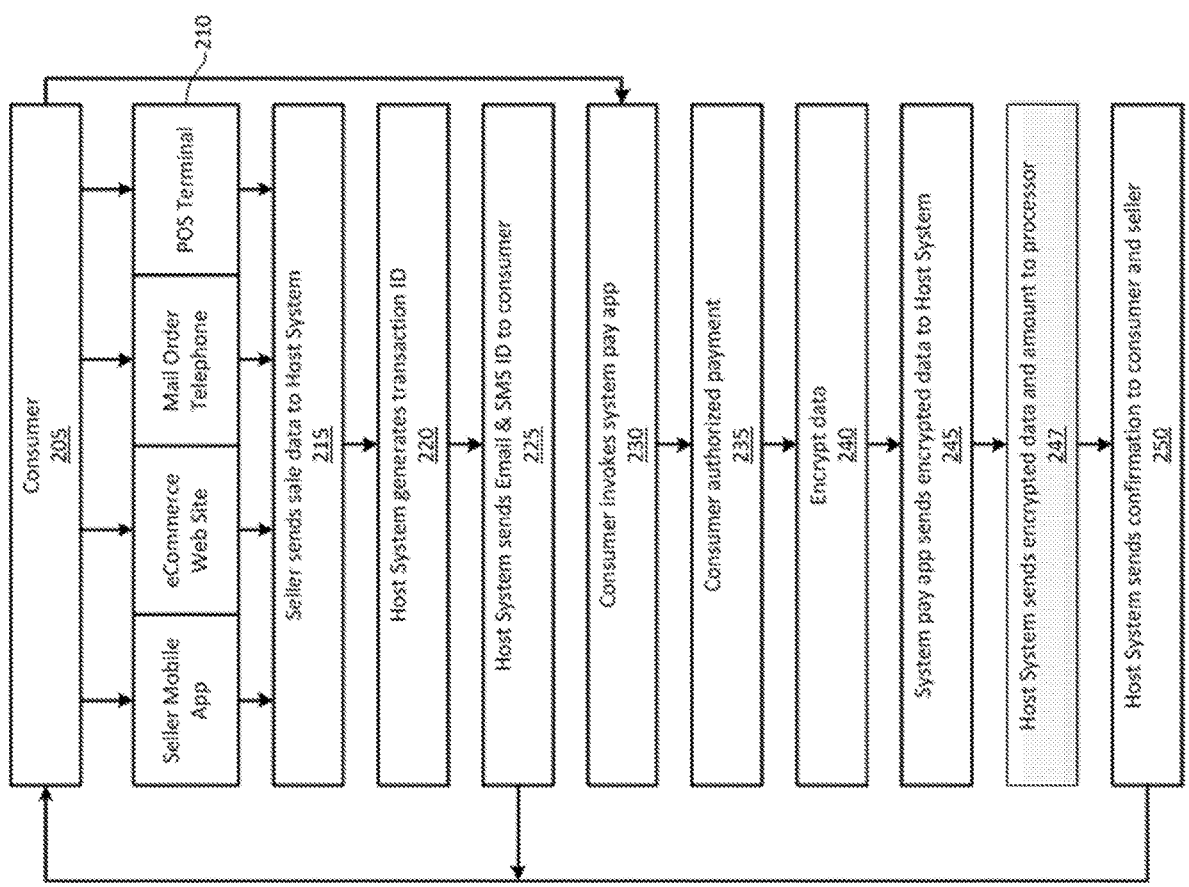
FIG. 2A is a flow diagram illustrating a method of securely performing transaction payments in accordance with an illustrative embodiment.

FIG. 2A is a flow diagram illustrating a method of securely performing transaction payments in accordance with an illustrative embodiment. In alternative embodiments, additional, fewer, and/or different operations may be performed. Also, the use of a flow chart and/or arrows is not meant to be limiting with respect to the order or flow of operations and/or information. For example, in an illustrative embodiment, two or more operations may be performed simultaneously. In an illustrative embodiment, the method 200 is a method in which a consumer initiates a purchase transaction by accessing one of several different methods to pay for the purchase.

In operations 205 and 210, a consumer entity selects a payment method, which may include (but is not limited to) a mobile app with in-app purchase function, a mobile app with a mobile shopping cart application, an ecommerce website designed for sale of products and services, a mail order fulfillment center that processes sales transactions, a call center agent processing telephone order transactions, and an in store face to face purchase transaction for products and services. The consumer starts the purchase transaction by providing the seller (merchant) billing and shipping information along with the details of the purchase in an operation 215.

The merchant clicks on a payment system button that triggers the button software to contact payment servers to deliver the billing and shipping details without the card data and receives in return a transaction ID. In an operation 220, the system generates a transaction ID and communicates the ID to the consumer via email and/or SMS text message to the phone number provided in the billing data in an operation 225.

After receiving the transaction ID, the customer invokes the mobile app in operations 230 and delivers the payment data to the payment servers via ApplePay, Google Wallet, AndroidPay, SamsungPay, Bitcoin, Visa Checkout, or another method or simply entering the data into the system app. In an operation 240, the mobile app encrypts the data from the customer. The system combines the billing and shipping data from the merchant and the payment data from the consumer and securely send the data to a processor to complete the transaction in an operation 245. In an operation 247, the host system sends encrypted card data and an amount of the transaction to a processor and receives in return an approval code. The system sends a confirmation of the transaction to the buyer and the seller in an operation 250.

Figure 2B:
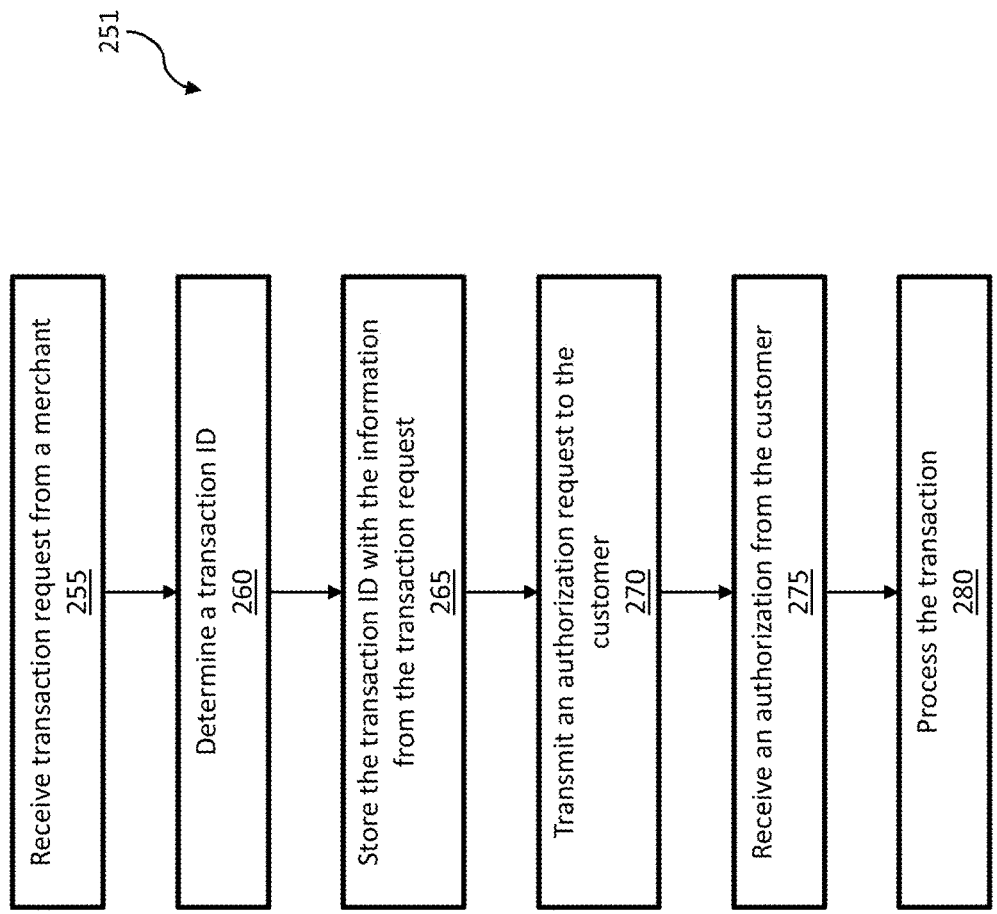
FIG. 2B is a flow diagram illustrating a method of securely performing transaction payments in accordance with an illustrative embodiment.

FIG. 2B is a flow diagram illustrating a method of securely performing transaction payments in accordance with an illustrative embodiment. In alternative embodiments, additional, fewer, and/or different operations may be performed. Also, the use of a flow chart and/or arrows is not meant to be limiting with respect to the order or flow of operations and/or information. For example, in an illustrative embodiment, two or more operations may be performed simultaneously. In an illustrative embodiment, the method 251 is a method in which a consumer initiates a purchase transaction by accessing one of several different methods to pay for the purchase. In an illustrative embodiment, the method 251 is performed by a server or a bank of servers.

In an operation 255, a transaction request is received from a merchant. In an illustrative embodiment, the transaction request includes customer identification information, merchant identification information, and a transaction amount. The customer identification information can be any suitable identification information such as a customer name, a customer's user ID, a shipping and/or billing address of the customer, etc. The merchant identification information can be any suitable identification information such as a merchant name, a merchant's user ID, an address of the merchant, a logo of the merchant, etc. In an alternative embodiment, the transaction request can include any suitable information. In an illustrative embodiment, the received transaction request was encrypted by the merchant using an encryption key.

In an operation 260, a transaction ID is determined. In an illustrative embodiment, the transaction ID is generated randomly. In an illustrative embodiment, the transaction ID is a unique transaction ID in that no other transaction request using the present system is assigned the same transaction ID.

In an operation 265, the transaction ID is stored with the information from the transaction request. For example, the transaction request can include a customer user ID, a merchant user ID, and a transaction amount. The operation 265 includes storing the determined transaction ID, the customer user ID, the merchant user ID, and the transaction amount together. In such an example, the database that the information is stored in can be searchable, and the transaction information may be found by searching any of the stored fields. In an illustrative embodiment, some information from the transaction request may not be stored permanently. For example, the shipping or billing address of the customer may not be stored after the transaction is completed or denied.

In an operation 270, an authorization request is transmitted to the customer. In an illustrative embodiment, a server sends the customer a text message, an email, or another electronic communication. The communication includes a message requesting that the customer approve or deny the transaction that was requested from the merchant. For example, the communication can include an identification of the merchant such as a merchant user ID, a merchant name, a merchant address, etc. The communication can also include an amount of the transaction requested. The communication can include any other suitable information such as an identification of each item to be purchased and the respective prices to be paid.

In an illustrative embodiment, the authorization request includes a link such as a hyperlink. The user can click on the link to facilitate authorization. For example, clicking on the link from an email or text message application on the user's computing device (e.g., a smartphone or tablet) can cause a payment application to open on the computing device. The payment application can allow the user to enter payment information. The payment information can include information sufficient to facilitate the transfer of money from the customer to the merchant. For example, the payment information can be related to a credit card, an electronic check, or an electronic wallet.

In an operation 275, an authorization from the customer is received. In an illustrative embodiment, the authorization from the customer is received via a payment application on the customer's computing device. For example, the authorization can include payment information. In an embodiment in which the customer does not authorize the transaction, the customer can indicate that the payment is not authorized or the customer may not reply to the authorization request. In an illustrative embodiment, the authorization is encrypted by the customer's computing device, and the receiving server decrypts the authorization using an encryption key.

As shown in FIG. 2B, in an illustrative embodiment, the operation 270 is performed before the operation 275. In such an embodiment, an authorization request is transmitted to the customer before the customer provides payment information to either the merchant or the servers. Thus, in such an embodiment, the customer's payment information is only provided to anyone if the customer approves the transaction.

In an operation 280, the transaction is processed. For example, the payment information received in the authorization from the customer can be used to process the transaction with a bank, credit card company, or third party transaction processing service.

Figure 3:
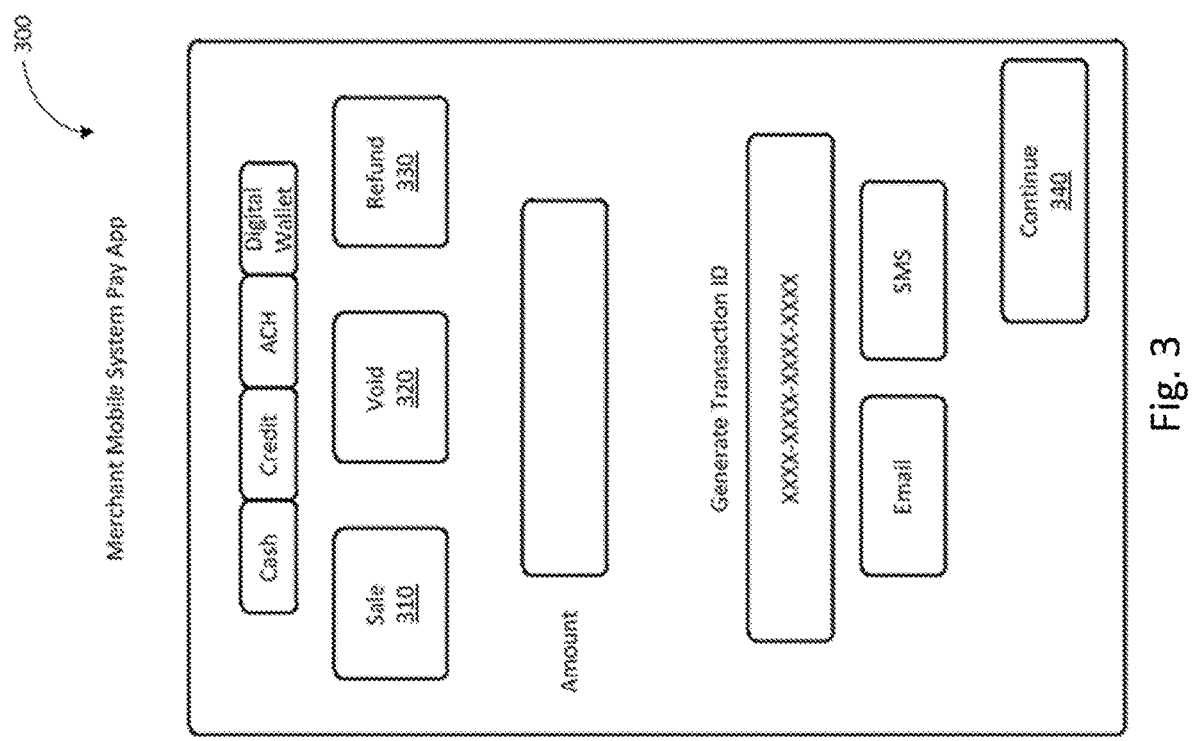
FIG. 3 is a merchant graphical user interface for an exemplary electronic application configured to provide secure transaction payments in accordance with an illustrative embodiment.

FIG. 3 illustrates a merchant graphical user interface 300 for an exemplary electronic application configured to provide secure transaction payments. The app allows a merchant to process a cash, credit, eCheck (ACH) and a digital wallet payment transaction by selecting the method and entering the amount followed by generating a transaction ID. In an illustrative embodiment, a cash option can be used to record a transaction such that the back-end system can account for or record the transaction/money. Cash can be exchanged between the merchant and the purchaser in a face-to-face transaction. The merchant may select the transaction type (e.g., sale, void, or refund). The merchant clicks on the email or SMS button to send the transaction ID to the consumer regardless of whether the consumer is in front of them or not.

In an illustrative embodiment, there can be three basic types of transactions represented in the interface by sale button 310, void button 320, and refund button 330. A sale transaction is where the consumer purchases a product or service from the merchant. The void transaction is used to initiate a partial or full cancellation of a previous sale transaction processed during the same day before the transaction is settled. The refund transaction is used to initiate a transaction to refund the amount of a previously processed sale after the transaction has already settled, typically any time after the day of the transaction.

When the merchant clicks on the continue button 340, the app shows the details of the status of the transaction whether the consumer has completed the transaction or not. The merchant can communicate the transaction ID to the the consumer verbally face to face or over the phone in case the consumer is not able to access email or Text messages.

Figure 4:
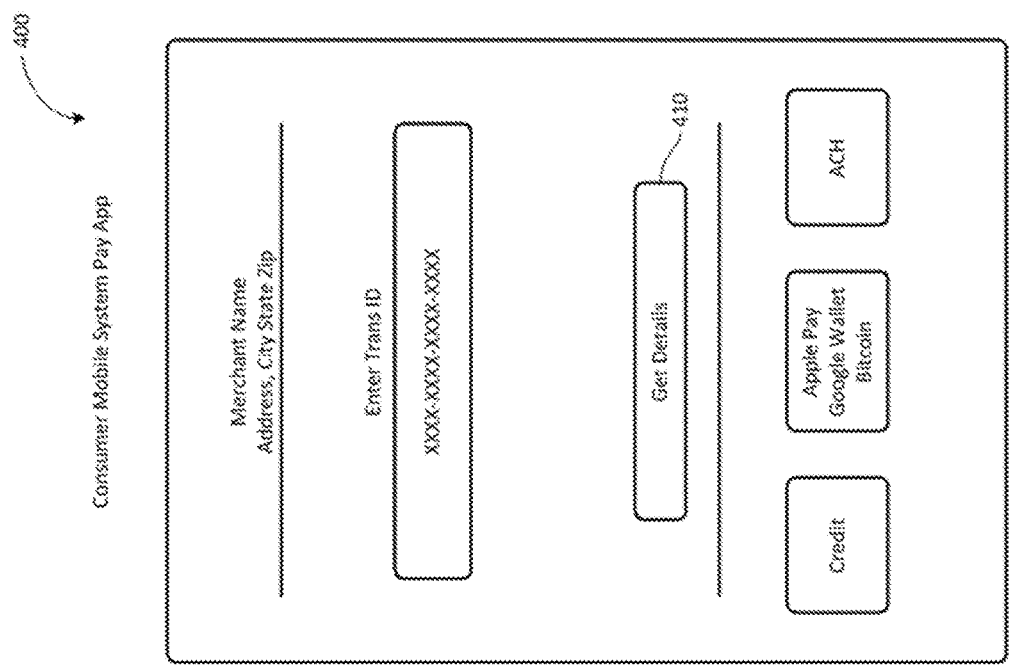
FIG. 4 is a consumer graphical user interface for an exemplary electronic application configured to provide secure transaction payments in accordance with an illustrative embodiment.

FIG. 4 illustrates a consumer graphical user interface 400 for an exemplary electronic application configured to provide secure transaction payments. If the consumer receives an email or an SMS text message on their phone with the mobile app, the consumer can invoke the app by clicking on the link with the transaction ID. The app then displays the merchant name and the Transaction ID pre-populated in the correct field.

The consumer clicks on the get details button 410 for the app to retrieve the billing and shipping details from the payment servers based on the transaction ID. At this time, the consumer has the option of authorizing the payment by clicking on one of the payment methods buttons: credit, ApplePay, and ACH. If credit is selected, the consumer is able to enter credit card information which is immediately encrypted and sent to the payment servers for processing. If the consumer clicks on the ApplePay, Google Wallet, or Bitcoin button, the app invokes the appropriate screens to complete the correct payment transaction by sending the data to the payment servers for further processing. If the consumer clicks on the ACH button, the consumer can enter the bank routing and checking or savings account information which is then sent to the processor to complete the ACH transaction.

Figure 5:
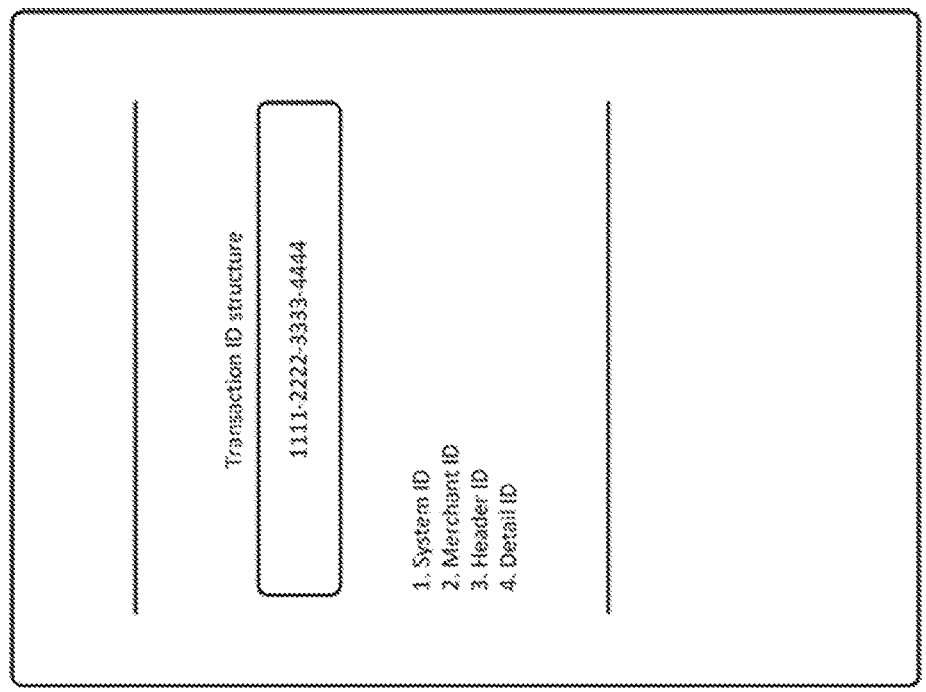
FIG. 5 is a block diagram illustrating an exemplary transaction identifier for secure transaction payments in accordance with an illustrative embodiment.

FIG. 5 illustrates an exemplary transaction identifier for secure transaction payments. In an illustrative implementation, the structure of the transaction ID consists of a number which is the output of a packing algorithm that combines several fields, including a system ID, a merchant ID, a header ID, and a detail ID. For example, the header ID and the detail ID can be fields embedded in the transaction ID. The system ID identifies the highest level organization details. The merchant ID identifies the merchant or location within the system. The header ID and detail ID identify the transaction. Together the combined number is a unique identifier for every transaction.

Figure 6:
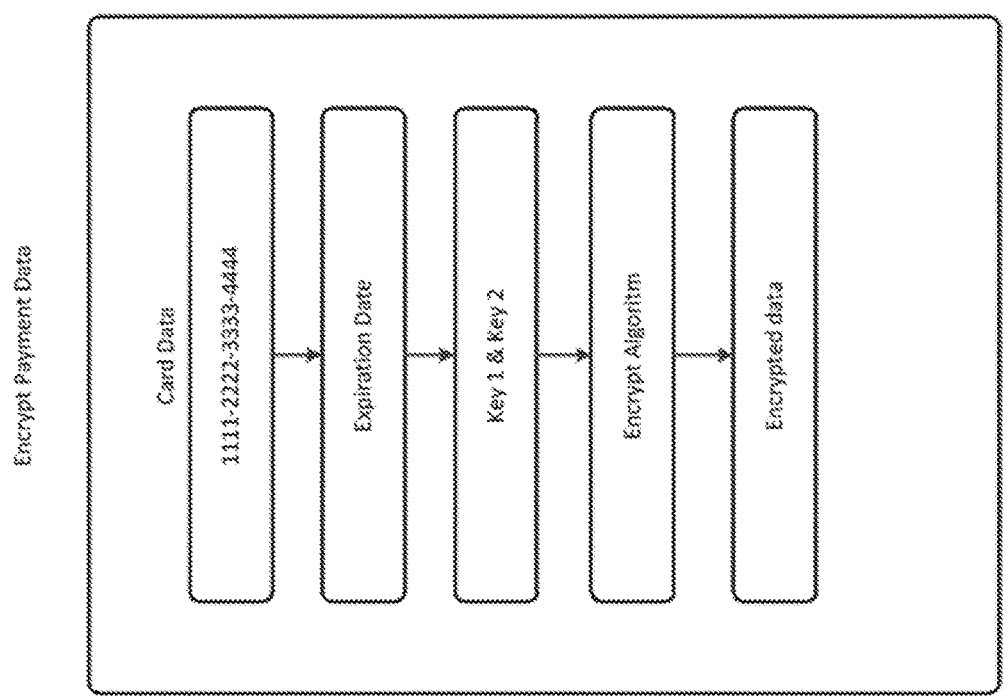
FIG. 6 is a flow diagram illustrating an exemplary process for encryption of payment data in a method of securely performing transaction payments in accordance with an illustrative embodiment.

FIG. 6 illustrates a flow diagram depicting the design of the encryption of the card data and expiration dates sent to the payment servers. Key 1 is stored in the device and Key 2 comes from the payment server along with the transaction ID and allows the system to specify a unique Key 2 for every transaction making it even more secure. Key 1 is assigned to a device by a system server when the app is installed. Key 1 is embedded in every encrypted data packet sent to the server. The server extracts Key 1 from the encrypted data stream and uses it to retrieve Key 2 which is used to decrypt the rest of the encrypted packet. The encrypted packet is decrypted using Key 1 and Key 2.

Figure 7:
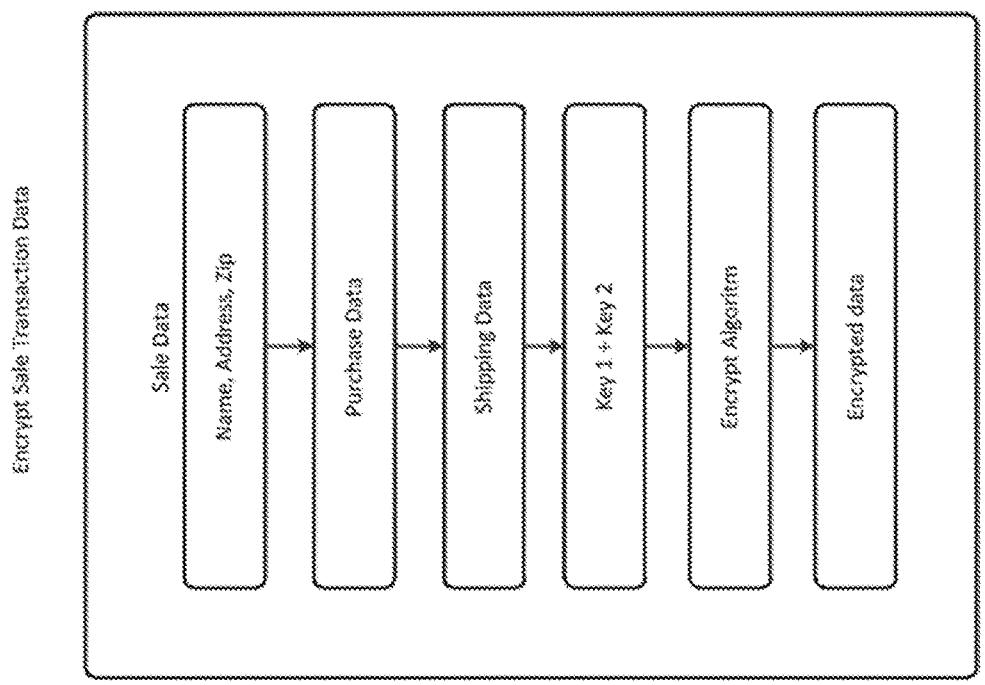
FIG. 7 is a flow diagram illustrating an exemplary process for encryption of transaction data in a method of securely performing transaction payments in accordance with an illustrative embodiment.

FIG. 7 illustrates an exemplary process for encryption of transaction data including the design of the encryption of the billing data sent from the payment application to the payment servers in a method of securely performing transaction payments.

Key 1 is a GUID (graphical user identifier) for the instance of the payment application button in the device or website URL and Key 2 comes from the payment server before generating the transaction ID. Key 1 is assigned to a device by a system server when the app or button is generated for a website. Key 1 is embedded in every encrypted data packet sent to the server. The server extracts Key 1 from the encrypted data stream and uses it to retrieve Key 2 which is used to decrypt the rest of the encrypted packet. The encrypted packet is decrypted using Key 1 and Key 2. Key 2 can be unique per transaction, per device, or button instance. The choice depends on transaction volume vs security considerations. This mechanism allows the system to specify a unique Key 2 for every transaction making it even more secure but it can be implemented with a static Key 2 per device or button instance.

Figure 9:
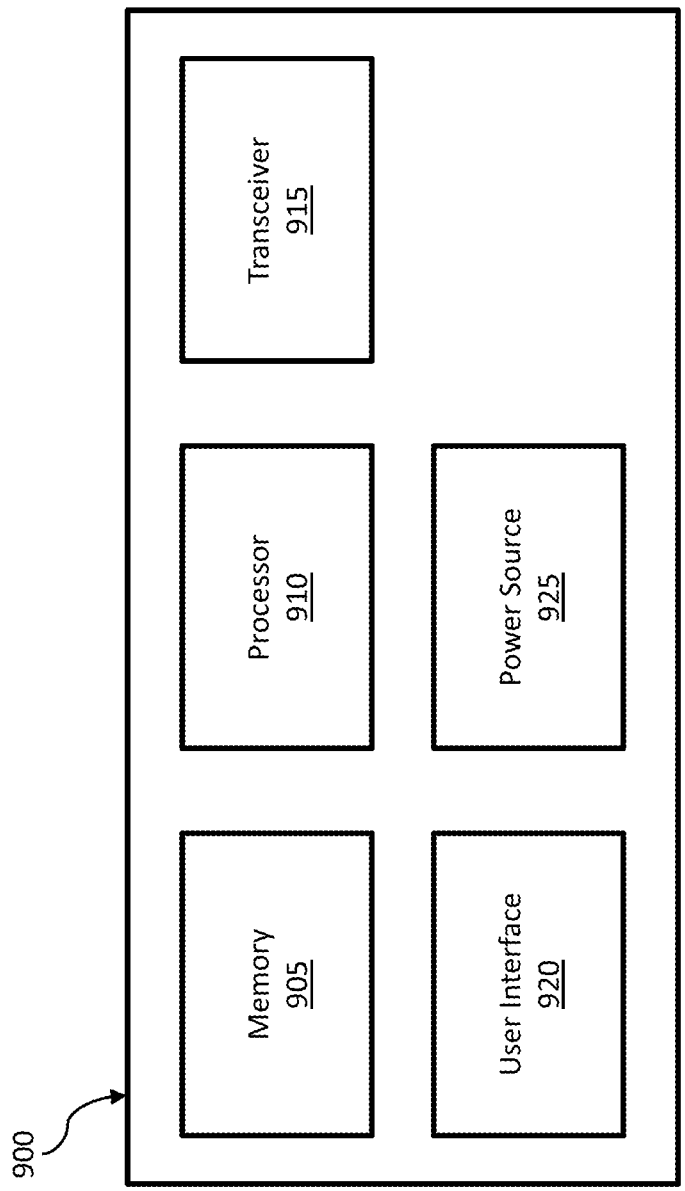
FIG. 9 is a block diagram of a computing device in accordance with an illustrative embodiment.

FIG. 9 is a block diagram of a computing device in accordance with an illustrative embodiment. An illustrative computing device 900 includes a memory 905, a processor 910, a transceiver 915, a user interface 920, and a power source 925. In alternative embodiments, additional, fewer, and/or different elements may be used. The computing device 900 can be any suitable device described herein. For example, the computing device 900 can be a desktop computer, a laptop computer, a smartphone, a specialized computing device, etc. The computing device 900 can be used to implement one or more of the methods described herein.

In an illustrative embodiment, the memory 905 is an electronic holding place or storage for information so that the information can be accessed by the processor 910. The memory 905 can include, but is not limited to, any type of random access memory (RAM), any type of read only memory (ROM), any type of flash memory, etc. such as magnetic storage devices (e.g., hard disk, floppy disk, magnetic strips, etc.), optical disks (e.g., compact disk (CD), digital versatile disk (DVD), etc.), smart cards, flash memory devices, etc. The computing device 900 may have one or more computer-readable media that use the same or a different memory media technology. The computing device 900 may have one or more drives that support the loading of a memory medium such as a CD, a DVD, a flash memory card, etc.

In an illustrative embodiment, the processor 910 executes instructions. The instructions may be carried out by a special purpose computer, logic circuits, or hardware circuits. The processor 910 may be implemented in hardware, firmware, software, or any combination thereof. The term "execution" is, for example, the process of running an application or the carrying out of the operation called for by an instruction. The instructions may be written using one or more programming language, scripting language, assembly language, etc. The processor 910 executes an instruction, meaning that it performs the operations called for by that instruction. The processor 910 operably couples with the user interface 920, the transceiver 915, the memory 905, etc. to receive, to send, and to process information and to control the operations of the computing device 900. The processor 910 may retrieve a set of instructions from a permanent memory device such as a ROM device and copy the instructions in an executable form to a temporary memory device that is generally some form of RAM. An illustrative computing device 900 may include a plurality of processors that use the same or a different processing technology. In an illustrative embodiment, the instructions may be stored in memory 905.

In an illustrative embodiment, the transceiver 915 is configured to receive and/or transmit information. In some embodiments, the transceiver 915 communicates information via a wired connection, such as an Ethernet connection, one or more twisted pair wires, coaxial cables, fiber optic cables, etc. In some embodiments, the transceiver 915 communicates information via a wireless connection using microwaves, infrared waves, radio waves, spread spectrum technologies, satellites, etc. The transceiver 915 can be configured to communicate with another device using cellular networks, local area networks, wide area networks, the Internet, etc. In some embodiments, one or more of the elements of the computing device 900 communicate via wired or wireless communications. In some embodiments, the transceiver 915 provides an interface for presenting information from the computing device 900 to external systems, users, or memory. For example, the transceiver 915 may include an interface to a display, a printer, a speaker, etc. In an illustrative embodiment, the transceiver 915 may also include alarm/indicator lights, a network interface, a disk drive, a computer memory device, etc. In an illustrative embodiment, the transceiver 915 can receive information from external systems, users, memory, etc.

In an illustrative embodiment, the user interface 920 is configured to receive and/or provide information from/to a user. The user interface 920 can be any suitable user interface. The user interface 920 can be an interface for receiving user input and/or machine instructions for entry into the computing device 900. The user interface 920 may use various input technologies including, but not limited to, a keyboard, a stylus and/or touch screen, a mouse, a track ball, a keypad, a microphone, voice recognition, motion recognition, disk drives, remote controllers, input ports, one or more buttons, dials, joysticks, etc. to allow an external source, such as a user, to enter information into the computing device 900. The user interface 920 can be used to navigate menus, adjust options, adjust settings, adjust display, etc.

The user interface 920 can be configured to provide an interface for presenting information from the computing device 900 to external systems, users, memory, etc. For example, the user interface 920 can include an interface for a display, a printer, a speaker, alarm/indicator lights, a network interface, a disk drive, a computer memory device, etc. The user interface 920 can include a color display, a cathode-ray tube (CRT), a liquid crystal display (LCD), a plasma display, an organic light-emitting diode (OLED) display, etc.

In an illustrative embodiment, the power source 925 is configured to provide electrical power to one or more elements of the computing device 900. In some embodiments, the power source 925 includes an alternating power source, such as available line voltage (e.g., 120 Volts alternating current at 60 Hertz in the United States). The power source 925 can include one or more transformers, rectifiers, etc. to convert electrical power into power useable by the one or more elements of the computing device 900, such as 1.5 Volts, 8 Volts, 12 Volts, 24 Volts, etc. The power source 925 can include one or more batteries.

In an illustrative embodiment, any of the operations described herein can be implemented at least in part as computer-readable instructions stored on a computer-readable medium or memory. Upon execution of the computer-readable instructions by a processor, the computer-readable instructions can cause a computing device to perform the operations.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A system comprising:
  a merchant computing device having programmed instructions to:
    receive customer identification information that identifies a customer, wherein the customer identification information does not comprise payment information;
    receive transaction information comprising an amount of a transaction, wherein the transaction information does not comprise the payment information; and
    transmit to a host server a transaction request that comprises the customer identification information and the transaction information;
  the host server having programmed instructions to:
    receive the transaction request from the merchant computing device;
    generate a transaction identifier associated with the customer identification information and the transaction information; and
    transmit to a customer computing device of the customer an authorization request comprising a link, the transaction identifier and merchant identification information;
  the customer computing device configured to:
    receive from the server the authorization request;
    invoke a payment application operating on the customer computing device to obtain the payment information, according to a response of the customer to the link;
    receive, from a user interface of the payment application, the payment information; and
    transmit, to the host server, an encrypted data packet including the payment information in response to the authorization request, wherein the encrypted data packet is encrypted using a first key;
  wherein the host server further has programmed instructions to:
    receive the encrypted data packet and the first key from the customer computing device;
    retrieve a second key with the first key; and
    decrypt the encrypted data packet using both the first key and the second key to obtain the payment information; and
  a payment processor having programmed instructions to:
    receive the payment information from the host server;
    process the transaction using the payment information from the decrypted data packet; and
    transmit a result notification to the host server.

2. The system of claim 1, wherein the merchant computing device does not receive the payment information.

3. The system of claim 1, wherein the payment information comprises payment information for an electronic wallet.

4. The system of claim 1, wherein the customer computing device further generates an authorization form according to the transaction identifier from the server, in response to the customer clicking the link.

5. A device comprising:
  memory that stores a transaction identifier corresponding to merchant identification information, customer identification information, and transaction information for a transaction; and
  a processor communicatively coupled to the memory and having programmed instructions to:

receive, from a merchant computing device, a transaction request that comprises the customer identification information and the transaction information, wherein the transaction request does not comprise payment information;

generate the transaction identifier, wherein the transaction identifier is unique to the merchant identification information, the customer identification information, and the transaction information;

transmit to a customer computing device an authorization request comprising a link, the transaction identifier and the merchant identification information;

receive, from the customer computing device, an encrypted data packet including the payment information and a first encryption key in response to the authorization request comprising the link;

retrieve a second key with the first key;

decrypt the encrypted data packet using the first key and the second key to obtain the payment information; and process the transaction using the payment information from the decrypted data packet.

6. The device of claim 5, wherein the processor does not receive the payment information from the merchant computing device.

7. The device of claim 5, wherein the payment information comprises payment information for an electronic wallet.

8. The device of claim 5, wherein the transaction information comprises a transaction amount.

9. The device of claim 5, wherein the transaction information comprises a line item list of items to be purchased by a customer operating the customer computing device.

10. The device of claim 5, wherein the customer identification information comprises a shipping address of a customer operating the customer computing device.

11. The device of claim 5, wherein the processor further having programmed instructions to transmit confirmation of the transaction to the merchant computing device and the customer computing device.

12. The device of claim 5, wherein the transaction request does not comprise an identification of a method of payment.

13. A method comprising:

receiving, by a server from a merchant computing device, a transaction request that comprises customer identification information and transaction information for a transaction, wherein the transaction request does not comprise payment information;

generating, by the server, a transaction identifier, wherein the transaction identifier is unique to merchant identification information, the customer identification information, and the transaction information;

transmitting, from the server to a customer computing device an authorization request comprising a link, the transaction identifier and the merchant identification information, the link that invokes a payment application operating on the customer computing device to obtain the payment information;

receiving, by the server from the customer computing device, an encrypted data packet including a first key and the payment information in response to the authorization request;

retrieving a second key with the first key;

decrypting, by the server, the encrypted data packet using the first key and the second key to obtain the payment information; and processing, by the server, the transaction using the payment information from the decrypted data packet.

14. The method of claim 13, wherein the method does not comprise receiving the payment information from the merchant computing device.

15. The method of claim 13, wherein the payment information comprises payment information for an electronic wallet.

* * * * *